(12) United States Patent
Piat et al.

(10) Patent No.: US 12,437,403 B1
(45) Date of Patent: Oct. 7, 2025

(54) COMPUTE SYSTEM WITH IMAGE DIAGNOSTIC MECHANISM AND METHOD OF OPERATION THEREOF

(71) Applicant: BelleTorus Corporation, Cambridge, MA (US)

(72) Inventors: Gauthier Marc Georges Piat, Toulouse (FR); Léa Mathilde Gazeau, Toulouse (FR); Duc Thang Nguyen, Toulouse (FR); Marwan-Mohamed Ajem, Toulouse (FR); Pierre Gillibert, Toulouse (FR); Tien Dung Nguyen, Toulouse (FR); Thi Thu Hang Nguyen, Toulouse (FR)

(73) Assignee: BelleTorus Corporation, Cambridge, MA (US)

( * ) Notice: Subject to any disclaimer, the term of this patent is extended or adjusted under 35 U.S.C. 154(b) by 0 days.

(21) Appl. No.: 19/087,060

(22) Filed: Mar. 21, 2025

Related U.S. Application Data

(60) Provisional application No. 63/764,797, filed on Feb. 28, 2025.

(51) Int. Cl.
 *G06T 7/00* (2017.01)
 *G06T 5/70* (2024.01)
(52) U.S. Cl.
 CPC ............. *G06T 7/0012* (2013.01); *G06T 5/70* (2024.01); *G06T 2207/20221* (2013.01); *G06T 2207/30088* (2013.01)

(58) Field of Classification Search
 CPC ............ G06T 2207/30088; G06T 2207/30201
 See application file for complete search history.

(56) References Cited

U.S. PATENT DOCUMENTS

| | | | |
|---|---|---|---|
| 2016/0110868 A1* | 4/2016 | Cheng | A61B 5/024 382/128 |
| 2019/0251674 A1* | 8/2019 | Chang | G06N 3/045 |
| 2021/0118133 A1* | 4/2021 | Benkert | G06T 5/73 |
| 2023/0092766 A1* | 3/2023 | Vodrahalli | G16H 50/50 382/128 |
| 2024/0193787 A1* | 6/2024 | Ding | G06T 5/70 |
| 2024/0404018 A1* | 12/2024 | Han | G06V 10/776 |

OTHER PUBLICATIONS

Wei, M., Wu, Q., Ji, H., Wang, J., Lyu, T., Liu, J., & Zhao, L. (2023). A Skin Disease Classification Model Based on DenseNet and ConvNext Fusion. Electronics, 12(2), 438. (Year: 2023).*

(Continued)

*Primary Examiner* — Gandhi Thirugnanam
(74) *Attorney, Agent, or Firm* — Perspectives Law Group, Corp.

(57) ABSTRACT

A method of operation of a compute system includes: generating a body mask based on the patient image; generating an overlaid synthetic ailment image for a targeted skin ailment and based on a patient image; generating a refined synthetic image based on the overlaid synthetic ailment image; generating a fused image based on the refined synthetic image by smoothing a visual imperfection and guided by the body mask; and communicating the fused image for displaying on a device.

20 Claims, 8 Drawing Sheets
(6 of 8 Drawing Sheet(s) Filed in Color)

(56) References Cited

OTHER PUBLICATIONS

Qin Z, Liu Z, Zhu P, Xue Y. A GAN-based image synthesis method for skin lesion classification. Comput Methods Programs Biomed. Oct. 2020; (Year: 2020).*

Heenaye-Mamode Khan M, Gooda Sahib-Kaudeer N, Dayalen M, Mahomedaly F, Sinha GR, Nagwanshi KK, Taylor A. Multi-Class Skin Problem Classification Using Deep Generative Adversarial Network (DGAN). Comput Intell Neurosci. Mar. 23, 2022 (Year: 2023).*

Dan Hendrycks, Norman Mu, Ekin D. Cubuk, Barret Zoph, Justin Gilmer, Balaji Lakshminarayanan, AugMix: A Simple Data Processing Method to Improve Robustness and Uncertainty,2019 (Year: 2019).*

Lu Chi, Borui Jiang, Yadong Mu, Fast Fourier Convolution, pp. 1 to 10, 34th Conference on Neural Information Processing Systems (NeurIPS 2020), Vancouver, Canada.

Roxana Daneshjou et al.; Disparities in dermatology AI performance on a diverse, curated clinical image set; Science Advances | Research Article, Daneshjou et al., Sci. Adv. 8, eabq6147 (2022) Aug. 12, 2022; pp. 1 to 7, Published Aug. 12, 2022, 10.1126/sciadv. abq6147; Copyright © 2022 The Authors, some rights reserved.

Alvaro Figueira and Bruno Vaz; Survey on Synthetic Data Generation, Evaluation Methods and GANs; pp. 1 to 41; Published by MDPI: Aug. 2, 2022; Copyright: © 2022 by the authors; Mathematics Oct. 2022, 2733. https://doi.org/10.3390/math10152733; https://www.mdpi.com/journal/mathematics.

Léa Gazeau, Hang Nguyen, Zung Nguyen, Mariia Lebedeva, Thanh Nguyen, Tat-Dat Tô, Jimmy Le Digabel, Jerome Filiol, Gwendal Josse, Clifford Perlis, and Jonathan Wolfe; AcneAI: A new acne severity assessment method using digital images and deep learning; pp. 1 to 11; This Medical Image Computing and Computer Assisted Intervention (MCCAI) paper is the Open Access version, provided by the MICCAI Society and is identical to the accepted version, except for the format and this watermark; the final published version is available on Oct. 4, 2024.

Syed Qasim Gilani and Oge Marques; Skin lesion analysis using generative adversarial networks: a review; Multimedia Tools and Applications (2023) 82: pp. 30065-30106; https://doi.org/10.1007/s11042-022-14267-z; Published online: Jan. 23, 2023; © The Author(s), under exclusive licence to Springer Science+Business Media, LLC, part of Publisher Springer Nature 2023.

Zhouxiao Li, Konstantin Christoph Koban, Thilo Ludwig Schenck, Riccardo Enzo Giunta, Qingfeng Li, and Yangbai Sun; Artificial Intelligence in Dermatology Image Analysis: Current Developments and Future Trends; pp. 1 to 33; Journal of Clinical Medicine; Multidisciplinary Digital Publishing Institute; Published: Nov. 18, 2022; Copyright: © 2022 by the authors; J. Clin. Med. 2022, 11, 68226; https://doi.org/10.3390/jcm11226826; https://www.mdpi.com/journal/jcm.

Anwesha Mohanty, Alistair Sutherland, Marija Bezbradica, and Hossein Javidnia; High Fidelity Synthetic Face Generation For Rosacea Skin Condition From Limited Data; pp. 1 to 23; arXivLABS:2303.04839v1 [cs, CV] Mar. 8, 2023.

Zhiwei Qin, Zhao Liu, Ping Zhu, Yongbo Xue; A GAN-based image synthesis method for skin lesion classification; pp. 1 to 19; Accepted May 21, 2020; Computer Methods and Programs in Biomedicine vol. 195, Oct. 2020, 105568; journal homepage: www.elsevier.com/locate/cmpb; https://doi.org/10.1016/j.cmpb.2020.105568; Copyright © 2020 / Publisher Elsevier B.V. All rights reserved.

Qichen Su, Haza Nuzly Abdull Hamed, Mohd Adham Isa, Xue Hao, and Xin Dai; A GAN-Based Data Augmentation Method for Imbalanced Multi-Class Skin Lesion Classification; pp. 16498 to 16513; vol. 12, 2024; date of publication Jan. 30, 2024, date of current version Feb. 5, 2024. Digital Object Identifier 10.1109/IEEE ACCESS. 2024.3360215; © 2024 The Authors. For more information, see https://creativecommons.org/licenses/by-nc-nd/4.0/.

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, Victor Lempitsky; Resolution-robust Large Mask Inpainting with Fourier Convolutions; pp. 2149 to 2159; Published in: 2022 IEEE/CVF Winter Conference on Applications of Computer Vision (WACV); Date of Conference: Jan. 3-8, 2022; Date Added to IEEE Xplore: Feb. 15, 2022; DOI: 10.1109/WACV51458.2022.00323.

Hazem Zein, Samer Chantaf, Regis Fournier, Amine Nait-Ali; Generative adversarial networks for anonymous acneic face dataset generation; pp. 1 to 15; PLoS One 19(4): e0297958. https://doi.org/10.1371/journal.pone.0297958; Published: Apr. 16, 2024; Copyright: © 2024 Zein et al.

* cited by examiner

COMPUTE SYSTEM WITH IMAGE DIAGNOSTIC MECHANISM AND METHOD OF OPERATION THEREOF

CROSS REFERENCE TO RELATED APPLICATION

This application claims the benefit of U.S. Provisional Patent Application Ser. No. 63/764,797 filed Feb. 28, 2025, and the subject matter thereof is incorporated herein by reference thereto.

TECHNICAL FIELD

An embodiment of the present invention relates generally to a compute system, and more particularly to a system with an AI based image diagnostic mechanism.

BACKGROUND

The process of generating images with skin ailments in dermatological application is inherently complex, and altering only the skin ailment and associate regions on an image without distorting the original content is even more challenging.

Thus, a need still remains for a compute system with an AI based dermatological application for skin ailment to provide AI based approach to modify patient images for diagnostic purposes and aid while minimizing impact or realism to the original image. In view of the ever-increasing commercial competitive pressures, along with growing healthcare needs, healthcare expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including: generating a body mask based on the patient image; generating an overlaid synthetic ailment image for a targeted skin ailment and based on a patient image; generating a refined synthetic image based on the overlaid synthetic ailment image; generating a fused image based on the refined synthetic image by smoothing a visual imperfection and guided by the body mask; and communicating the fused image for displaying on a device.

An embodiment of the present invention provides a compute system, including a control circuit, including a processor, configured to: generate a body mask based on the patient image; generate an overlaid synthetic ailment image for a targeted skin ailment and based on a patient image; generate a refined synthetic image based on the overlaid synthetic ailment image; generate a fused image based on the refined synthetic image by smoothing a visual imperfection and guided by the body mask; and communicate the fused image for displaying on a device.

An embodiment of the present invention provides a non-transitory computer readable medium including instructions executable by a control circuit for a compute system including: generating a body mask based on the patient image; generating an overlaid synthetic ailment image for a targeted skin ailment and based on a patient image; generating a refined synthetic image based on the overlaid synthetic ailment image; generating a fused image based on the refined synthetic image by smoothing a visual imperfection and guided by the body mask; and communicating the fused image for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
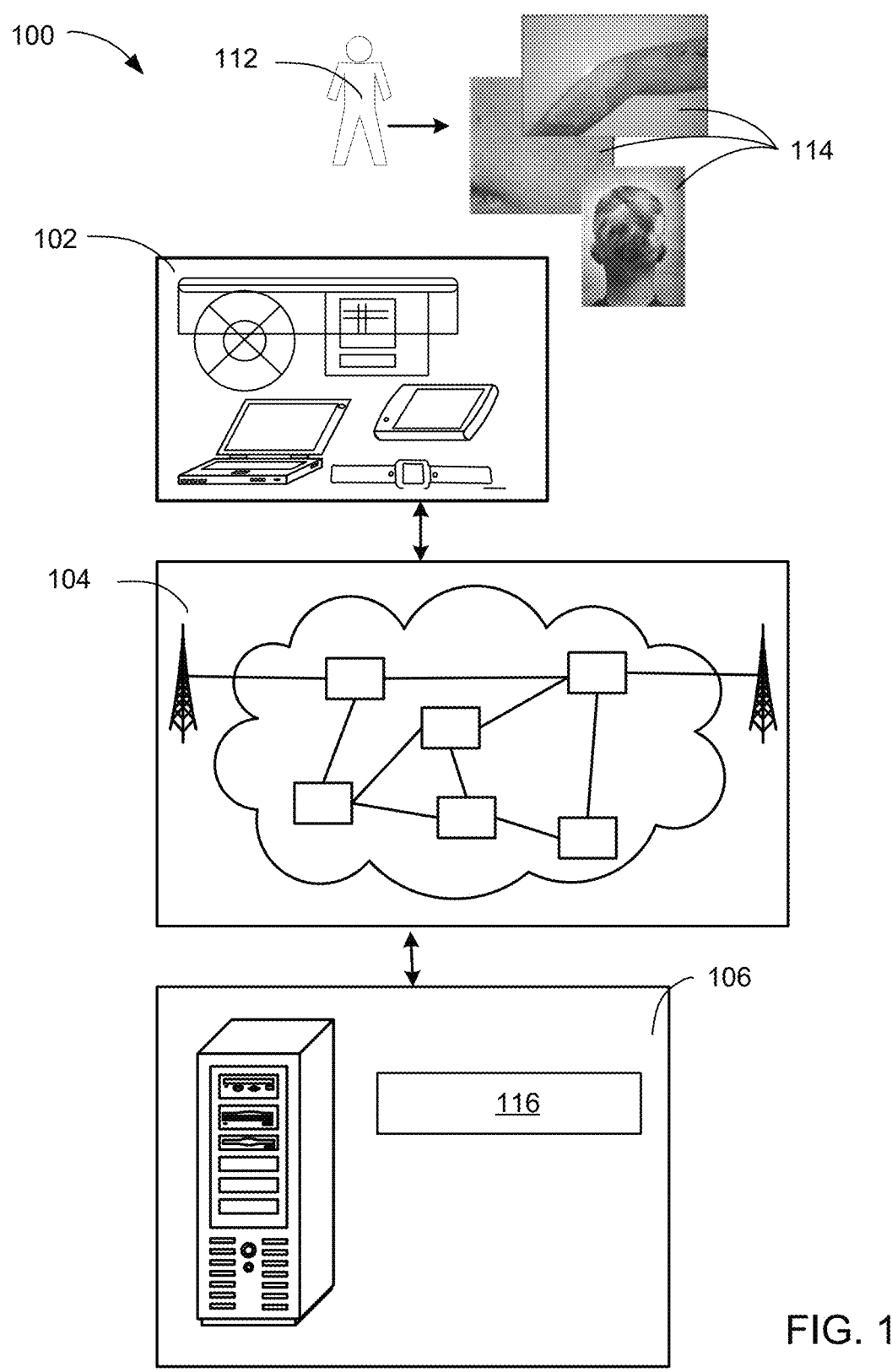
FIG. 1 is an example of a system architectural diagram of a compute system with an image diagnostic mechanism in an embodiment of the present invention.

Description of various embodiments of the present invention is described with an example of a dermatological application for skin ailment, and as a specific example of acne vulgaris. For this example, acne vulgaris, commonly referred to as acne, is a skin condition affecting millions of people worldwide. Early and accurate detection is crucial for effective treatment, and AI-driven diagnostic or assisted diagnostic approach aim to become the gold standard in dermatological analysis.

However, the effectiveness of AI-driven or assisted approaches depend on large, well-annotated datasets, which can be scarce and inconsistent. Synthetic data generation offers a promising solution by artificially increasing the volume and diversity of available training data while ensuring high-quality annotations. One or more embodiments provide a different and improved approach to Generative Adversarial Networks (GANs) to significant progress in synthesizing realistic skin images with disease or not. One or more embodiments also provide generative models in producing realistic dermatologic images, such as synthetic acne images.

One or more example embodiments provide generative models to create diverse, high-quality acne datasets, contributing to a more comprehensive collection for training deep learning systems. In dermatology, large and varied datasets to ensure that models can work well across different skin types, lighting conditions, and acne severities. This ability to generate synthetic data presents a solution to the ongoing challenge of limited access to well-annotated dermatological datasets.

One or more example embodiments address GANs acne-affected skin images where challenges persist. One or more embodiments address the struggle to fully capture the clinical variability of acne, including differences in lesion types, distributions, and skin textures. Without addressing these limitations, the limitations impact the ability of AI models to generalize in real-world scenarios, where acne can appear in numerous forms and locations. One or more embodiments include generative models not only produce high-quality images but also address ensuring that the synthetic acne images accurately reflect real-world dermatological diagnoses. Otherwise, small imperfections or inconsistencies in images can significantly undermine the performance of AI systems, reducing their clinical reliability.

Additionally, one or more embodiments are not limited to focus on generating full-face images, which would limits GAN models ability to target specific areas of the skin affected by acne. Without addressing focus beyond full-face by one or more embodiments, the lack of focus would restrict the usefulness in personalized dermatological analysis, where understanding localized acne characteristics would be absent for treatment planning. While whole-face images can be helpful for general purposes, they do not provide the precision necessary for specialized medical applications, such as evaluating acne severity in a particular region of the face or body.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architectural diagram of a compute system with an image diagnostic mechanism in an embodiment of the present invention. One or more embodiments address the generation of images in a skin pathology application utilizing images and characterized by its ability to produce skin ailments with severity at specific locations, the lesion locations, lesion size, lesion type, or a combination thereof on the body. As an example, at least one embodiment is described for generation of images in a dermatological application. Further for example, at least one embodiment is described to address the generation of images with the capability to produce skin ailments with severity at specific lesion locations on the face. Also for example, at least one embodiment is described to address the generation of images for acne as the skin ailment.

The compute system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a smart phone, a tablet, a cellular phone, personal digital assistant, a notebook computer, a wearable device, internet of things (IoT) device, or other multi-functional device. Also, for example, the first device 102 can be included in a device or a sub-system.

The first device 102 can couple, either directly or indirectly, to the network 104 to communicate with the second device 106 or can be a stand-alone device. The first device 102 can further be separate form or incorporated with a smart phone, a tablet computer, a laptop computer, a scanner, or other personal electronic devices.

For illustrative purposes, the compute system 100 is described with the first device 102 as a mobile device, although it is understood that the first device 102 can be different types of devices. For example, the first device 102 can also be a non-mobile computing device, such as a server, a server farm, cloud computing, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as endpoints of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, the compute system 100 can provide the functions for the patients 112 or other users working with the patients 112 with the first device 102, the second device 106, distributed between these two devices, or a combination thereof. Also as examples, the compute system 100 can provide a mobile applications for the patients, the clinicians, or a combination thereof. Further as an example, the compute system 100 can provide the functions via a web-browser based applications or a software to be executed on the first device 102, the second device 106, distributed between these two devices, or a combination thereof.

In one embodiment as an example, patient images 114 are taken and uploaded by the patient or for the patient and reviewed by the clinician. In this embodiment, a patient launches the image diagnostic mechanism via the mobile application and logs into the patient's account. The patient or the user of the mobile application can be prompted to upload or take images as the patient images 114. The compute system 100 can guide a patient 112 or a user of the mobile application on photo guidelines for the patient images 114 and accepts or rejects the patient images 114 for retake based on a pre-specified criteria, e.g., distance, quality, blur, or a combination thereof. The compute system 100 can also provide guides for a patient or another user on capturing videos as opposed to still photos. Also for example, the patient images 114 can be selected from the video.

Once the patient images 114 are successfully uploaded, the compute system 100 can send or load the patient images 114 to a image diagnostic mechanism 116 for analysis. The image diagnostic mechanism 116 will be described later. For brevity and clarity and as an example, the image diagnostic mechanism 116 is shown as being executed in the second device 106 although it is understood that portions can operate on the first device 102, such as the mobile application or the web-browser based application, can operate completely on the first device 102, or a combination thereof. The image diagnostic mechanism 116 can be implemented in software running on specialized hardware, full hardware, or a combination thereof.

Based on analysis results, the compute system 100 can display information to the patient 112 including a recommendation based on the patient images 114, uploaded, for the patient 112 to schedule a visit with a primary care physician or with a specialist.

Continuing the example, the compute system 100 can provide a function that allows the clinician to access the patient images 114 uploaded by the patient 112 or for the patient 112 and the image diagnostic mechanism 116, such as with the web-based dashboard. The compute system 100 allows the clinician to make edits to annotations determined by the image diagnostic mechanism 116 and the scores (if necessary) and saves the results. The clinician can utilize the image diagnostic mechanism 116 to make the diagnostic decision and suggest necessary treatment steps (if applicable).

Figure 2:
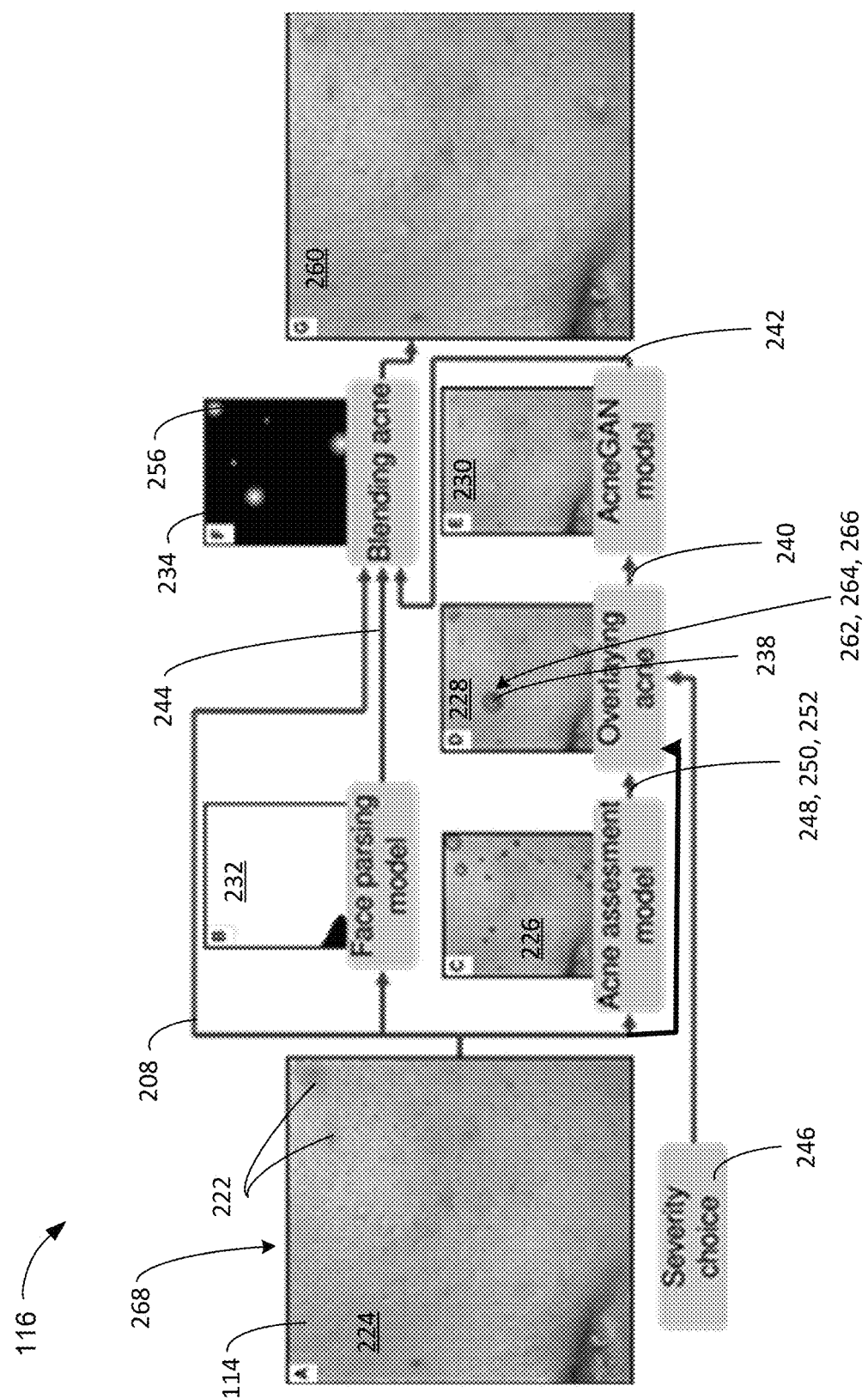
FIG. 2 is an example of a flow overview of an image diagnostic mechanism on at least a part of facial image in an embodiment.

Referring now to FIG. 2, therein is shown an example of a flow overview of an image diagnostic mechanism 116 on at least a part of facial image in an embodiment. The image diagnostic mechanism 116 can be included as part of the skin pathology diagnostic. As clarification and for ease of description, the overall architecture is called the image diagnostic mechanism 116 although it is understood that the name is not intended to be limiting. For example, the image diagnostic mechanism 116 can include more than one artificial intelligence (AI) model or machine learning model and the models can include different approaches. Also for example, the image diagnostic mechanism 116 can include other functions implement in software that is not considered artificial intelligence or machine learning.

In the example of at least one embodiment, the image diagnostic mechanism 116 provide the ability for a clinician, the clinician's staff, the patient, or a combination thereof to visually see whether a skin ailment is progressing or improving by viewing the output generated by the image diagnostic mechanism 116. The image diagnostic mechanism 116 can be adjusted with the severity selection 246 and generate a realistic image to project potential progression, improvement, no change, or a combination thereof. This projection with visual aids and realistic image generated by the image diagnostic mechanism 116 can help the patient, the clinician, the clinician's staff, or a combination thereof monitor the skin ailment.

As an example embodiment, FIG. 2 depicts a flow for the image diagnostic mechanism 116 to generate realistic synthesis with the ability for severity adjustment of targeted skin ailments 222, such as on the facial portion of the body and using acne as the example targeted skin ailment 222. The targeted skin ailment 222 represents an ailment type or condition to be analyzed and for this example embodiment the targeted skin ailment 222 is acne. The targeted skin ailment 222 can also specify a portion of the body or the ailment type can specify body locations. In this example, acne typically inflicts the facial region of the body.

In this example, the image diagnostic mechanism 116 includes an image input module 224, a skin ailment assessment module 226, an overlay ailment module 228, an ailment network module 230, a body parsing module 232, a blending module 234, an output module 236, or a combination thereof. In the example embodiment described, the image diagnostic mechanism 116 application is for acne as the targeted skin ailment 222 on the facial portion of the body.

Continuing with the example, the image input module 224 receives one or more of the patient images 114, such as a user-provided facial image. One path continues from the image input module 224 to the body parsing module 232. In this example, the body parsing module 232 identifies the body regions 268. In this example embodiment, the body regions 268 described are facial regions, appropriate for synthetic modification that can be used for monitoring and projections.

In this example, another path of the flow continues from the image input module 224 to the skin ailment assessment module 226. The skin ailment assessment module 226 analyzes the body images of interest from the accepted input image 220 from the image input module 224. In this example embodiment, the accepted input image 220 can be the facial image to detect and characterize existing skin ailments as the targeted skin ailments 222, identifying details such as severity 248, lesion type 254, and lesion size 250. The accepted input image 220 is the patient images 114 process by the image input module 224 and accepted to continue processing. In the example embodiment described, the accepted input image 220 can be viewed as a facial image but can also be an image of other portions of the body.

The flow can continue from the skin ailment assessment module 226 to the overlay ailment module 228. The overlay ailment module 228 places selected synthetic skin ailments 238 accurately onto the accepted input image 220 for the patient images 114, dynamically selecting suitable lesions from a clinically annotated dataset. The overlay ailment module 228 can place synthetic lesions that can contain visual imperfections 262 and generate an overlaid synthetic ailment image 240 with the selected synthetic skin ailments 238.

The flow can continue from the overlay ailment module 228 to the ailment network module 230. The ailment network module 230 generate a refined synthetic image 242 by refining the selected synthetic skin ailments 238 or the synthetic lesions in the overlaid synthetic ailment image 240 to remove the visual imperfections 262 and enhance the realism. After refinement, the blending module 234 generates a fused image 258 based on the refined synthetic image 242 the output from the body parsing module 232, ensuring seamless integration and natural transitions between synthetic and real skin regions.

The flow from the blending module 234 continues to the output module 236 to generate an output image 260 that is characterized by its clinical realism and visual accuracy and can be utilized for monitoring and projecting the progress of at least one of the targeted skin ailments 222. The output image 260 also supports dermatological training, educational purposes, dataset augmentation to improve diagnostic models for skin ailments, and visualization of realistic skin ailment severity scenarios.

Further details for operations, components, and technical aspects of each of these image input module 224, body parsing module 232, skin ailment assessment module 226, overlay ailment module 228, ailment network module 230, and blending module 234 will be described below.

As a description of the two paths illustrated from the image input module 224, the path to the skin ailment assessment module 226 (referred to as path 1 for brevity) and the body parsing module 232 (referred to as path 2 for brevity). For path 1, path 1 includes the role of severity selection 246, path 1 is described with starting with the image input module 224, which receives the patient images 114, such as body or a portion of the body images or facial images provided by a user or clinician or from another source. The skin ailment assessment module 226 analyzes the accepted input image 220 from the image input module 224 to detect and characterize targeted skin ailments 222, identifying details such as lesion severity 248, lesion type 254, and lesion size 250. The overlay ailment module 228 dynamically selects and accurately places selected synthetic skin ailments 238 onto the accepted input image 220 for the targeted skin ailment 222 at lesion locations 252 identified during analysis. The severity of selected synthetic skin ailments 238 is modulated based on the severity selection 246, enabling simulation of mild, moderate, or severe acne scenarios. Subsequently, the ailment network module 230 refines the selected synthetic skin ailments 238 in the overlaid synthetic ailment image 240 to enhance their realism and generate the refined synthetic image 242.

For path 2, path 2 incorporates outputs from the ailment network module 230 and proceeds from the image input module 224, followed by the body parsing module 232 generating a body mask 244 to define body regions 268 or facial regions for synthetic lesion blending. The blending module 234 receives inputs from the accepted input image 220, the body mask 244 generated by the body parsing module 232, and the refined synthetic skin image 242 from the ailment network module 230. The blending module 234 creates a weighted blending mask 256 based on parameters such as lesion size 250 and lesion severity 248, ensuring natural transitions between synthetic skin regions and real skin regions. This weighted blending mask 256 guides the integration, ultimately generating a fused image 258 characterized by its clinical realism.

Returning to the skin ailment assessment module 226, as an example embodiment this step provides data for accurately and realistically selecting and overlaying selected synthetic skin ailments 238 in the overlay ailment module 228, ensuring clinical relevance and visual authenticity. At the skin ailment assessment module 226, the image diagnostic mechanism 116 can be implemented in a number of ways. For example, the skin ailment assessment module 226 utilizes an artificial intelligence-based approach to detect targeted skin ailments 222 present in the accepted input image 220, such as a facial image. The skin ailment assessment module 226 can include analytical processes to segment, classify, and characterize individual targeted skin ailments 222. The skin ailment assessment module 226 can generate information on lesion severity 248, lesion type 254, and lesion size 250 that supports subsequent synthetic lesion placement and severity selection 246.

As a specific example, the skin ailment assessment module 226 can include image acquisition and pre-processing, targeted skin ailment segmentation, characterization of segmented targeted skin ailments 222, severity classification and scoring, comprehensive output dataset, or a combination thereof.

As an example of image acquisition and pre-processing, the patient images 114 are received and pre-processed, which may include normalization, resizing, cropping, or standardizing resolution.

Continuing the example, targeted skin ailment segmentation can be implemented in a number of ways. For example, the skin ailment assessment module 226 can perform the targeted skin ailment segmentation with an artificial intelligence model, with a specific example with a trained deep neural network segments individual targeted skin ailments 222 from the facial image. Further to a specific example, the segmentation model analyzes pixel-level details to identify the boundaries of each targeted skin ailment 222.

Further with this example, the skin ailment assessment module 226 can perform characterization of segmented targeted skin ailments 222 in a number of ways. For example, each of the targeted skin ailment 222 is individually analyzed to extract parameters including lesion position 252, lesion size 250, lesion type 254, and lesion severity 248.

More with this example, the skin ailment assessment module 226 can perform severity classification and scoring in a number of ways. For example, each of the targeted skin ailment 222 is assigned a score for lesion severity 248, enabling severity selection 246 for selected synthetic skin ailments 238 for synthetic dataset placement in the overlay ailment module 228.

Moreover with this example, the skin ailment assessment module 226 can generate a comprehensive output dataset in a number of ways. For example, structured digital data containing segmented lesion locations 252, lesion types 254, lesion sizes 250, and lesion severity 248 scores supports synthetic lesion alignment in the overlay ailment module 228.

Returning to the overlay ailment module 228, in an example embodiment this step perform synthetic ailment placement and described as a specific example of an embodiment with synthetic acne placement. In this example embodiment, the overlay ailment module 228 generates overlaid synthetic ailment image 240 and for this example for acne. The overlay ailment module 228 can select lesions from a curated acne dataset, such as 2340 lesions and overlaying these synthetic lesions onto detected acne locations for the lesion locations 252 from the skin ailment assessment module 226. The severity selection 246 can be applied or utilized by the overlay ailment module 228 such that lesion severity 248 can be independently modulated (mild, moderate, severe). This overlay can show visual imperfections 262, such as mismatches in coloration 266 or visible lesion contours 264.

As a specific example, the overlay ailment module 228 operates from the lesion segmentation and analysis generated by the skin ailment assessment module 226, the image diagnostic mechanism 116, the overlay ailment module 228, or a combination thereof can utilize a compiled dataset of synthetic acne lesions as the selected synthetic skin ailments 238. The complied database can be organized by severity selection 246 (mild, moderate, severe), skin tone for coloration 266, lesion size 250 (radius), or a combination thereof.

Continuing the example, the overlay ailment module 228 selects appropriate synthetic lesions for the selected synthetic skin ailments 238 from the complied dataset, corresponding to lesion parameters identified during the initial lesion analysis including lesion severity 248 (to match user-selected severity selection 246), lesion location 252, lesion size 250 (radius), or a combination thereof matching those detected by the skin ailment assessment module 226.

The selected synthetic skin ailments 238, in this example the selected synthetic acne lesions, are overlaid onto corresponding lesion locations 252 on the patient images 114 being analyzed or the accepted input image 220. In this example, the overlay is to fully cover or partially cover the detected areas of ailment or the ailment-like lesion, such as acne or acne-like lesions. The image diagnostic mechanism 116, the overlay ailment module 228, or a combination thereof provides dynamic and independent control of lesion severity 248, aligning the visual appearance of lesions with the selected severity selection 246 (mild, moderate, or severe).

Further, the overlay ailment module 228 can generate the overlaid synthetic ailment images 240, which are the images with the overlay with visual imperfections 262 and further refinement can be applied. As a specific example, the overlay ailment module 228 generates images where the pasted ailment, such as acne lesions, does not seamlessly blend into the original skin utilizing the accepted input image 220. Further as a specific example, the contour 264 of synthetic lesions are still visible in the overlaid synthetic ailment image 240 and the coloration 266 mismatch can exist between synthetic ailment lesions, such as synthetic acne lesions, and surrounding natural skin tone. The flow can progress from the overlay ailment module 228 to the ailment network module 230 for potential refinement of the overlaid synthetic ailment image 240 to generate the refined synthetic image 242 as the improved seamless integration and realistic appearance.

Returning to the example embodiment for the ailment network module 230, this module addresses the clinical and visual imperfections 262 challenges of dermatological targeted skin ailment 222, such as acne image generation, offering severity control, free of visual imperfections 262, clinically validated realism, and specialized neural network customizations, and is not a traditional, general-purpose Generative Adversarial Network (GAN) inpainting architecture. In this example, the ailment network module 230 refines overlaid synthetic ailment image 240 from the overlay ailment module 228 ensuring that synthetic lesions seamlessly blend with the accepted input image 220, such as a user's original facial skin.

In this example, the ailment network module 230 performs refinement on the synthetic ailment placement, such as synthetic acne placement, by inpainting to achieve seamless blending of synthetic ailment lesions, such as synthetic acne lesions, with natural skin. The ailment network module 230 targets issues or visual imperfections 262 in the overlaid synthetic ailment image 240 from the overlay ailment module 228, such as visible lesion boundaries (unnatural edges around pasted acne), mismatches in skin tone or brightness or textures, or a combination thereof between synthetic lesions and original skin regions.

As a more specific example, the ailment network module 230 performs lesion level refinement to address the visual imperfections 262 for the skin ailment lesion, such as for acne, from the placement by the overlay ailment module 228. Examples of the visual imperfections 262 include visible lesion boundaries, unnatural textures, or mismatched coloration 266. The ailment network module 230 refines each skin ailment lesion, such as for acne, based on lesion characteristics (lesion size 250, radius, skin tone, lesion severity 248) previously extracted by the skin ailment assessment module 226 and leveraged during lesion placement by the overlay ailment module 228.

Relating the ailment network module 230 and dynamic severity adjustment and modulation, the ailment network module 230 accommodates the dynamic severity modulation feature ("Severity Choice" as severity selection 246) utilized in the overlay ailment module 228, ensuring that synthetic lesions visually correspond to the user or clinician-selected targeted skin ailment 222 severity (mild, moderate, severe). In this example, the ailment network module 230 is trained to adaptively refine lesions, harmonizing differences between the initial synthetic lesion severity and the original skin characteristics. The ailment network module 230 can correct for visual imperfections 262, such as blurriness, visual imperfections 262, or color discrepancies noted in the synthetic image from the overlay ailment module 228.

Returning to the blending module 234, this step has inputs from the ailment network module 230 as well as other inputs. This step will be described later after the description of path 2 with the body parsing module 232.

Returning to the body parsing module 232, this step generates spatial boundaries and context for lesion placement. As a specific example, the body parsing module 232 generates a body mask 244, in this example embodiment a face mask, to define the region of interest for the ailment modification that occurs within the portion of the body covered by the body mask 244. For this example embodiment, the body parsing module 232 defines the face mask for acne modification that is applied within the facial areas.

As a specific example, the body parsing module 232 identifies and isolates body regions 268, such as facial regions for this example embodiment, from the patient images 114 or the accepted input image 220, such as a facial image. The body regions 268 that are identified or isolated are delineating areas suitable for the realistic modification and synthesis of ailment lesions, such as acne lesions. The body parsing module 232 performs body segmentation or body parsing or, for the example embodiment for the face as the portion of the body, face segmentation or face parsing.

The body parsing module 232 can include a body region identification, a body mask 244, an artificial intelligence model, and integration to the other steps in the image diagnostic mechanism 116. As an example, the body parsing module 232 for the face as the portion of the body, the body region identification processes the accepted input image 220 from the image input module 224 for the face. The body parsing module 232 segments the body from the background outlining the body boundary, a portion of the body in the patient images 114, the accepted input image 220, a portion of interest of the body region 268, or a combination thereof.

As a specific example, the body parsing module 232 processes the accepted input image 220 by segmenting it into distinct body regions 268, including the different parts of the body such as the head, torso, legs, arms, or a combination thereof, as well as sub-portions of different parts such as fingers, toes, ears, forearm, back, front, as examples. The body masks 244 can also include information regarding the body segmentation of the different portions of the body or the body regions 268. The body parsing module 232 can generate per-pixel probability maps for each region, which are then converted into binary masks and resized to match the original image dimensions or the dimensions of the patient images 114, the accepted input image 220, or a combination thereof. Morphological operations such as erosion and dilation are applied to refine these masks, enhancing the boundaries and reducing noise. In particular, non-body-part interest region elements are systematically removed from the primary body mask 244, isolating the body region 268.

In this example embodiment, the body parsing module 232 segments the face from the background outlining the facial boundary. The body parsing module 232 can also identify facial areas including cheeks, forehead, chin, and other acne-prone regions, generating a defined binary mask (face region vs. non-facial regions).

As a specific example for this embodiment, the body parsing module 232 processes the accepted input image 220 by segmenting it into distinct facial regions, including the face, nose, eyes, ears, mouth, hair, beard, and neck. The body masks 244 can also include information regarding the face segmentation of the different portions of the face or the face regions. The body parsing module 232 can generate per-pixel probability maps for each region, which are then converted into binary masks and resized to match the original image dimensions or the dimensions of the patient images 114, the accepted input image 220, or a combination thereof. Morphological operations such as erosion and dilation are applied to refine these masks, enhancing the boundaries and reducing noise. In particular, non-face elements are systematically removed from the primary face mask, isolating the face region.

In this example embodiment, the body parsing module 232 generates the face mask as the body mask 244. The body mask 244 or, in this example, the face mask constrains the acne synthesis to clinically relevant facial regions as the body regions 268. The body mask 244 or, in this embodiment, the face mask prevents synthetic acne from being incorrectly placed on irrelevant or anatomically inaccurate body region 268 (e.g., hair, eyes, background).

The body parsing module 232 can be implemented in a number of ways. For example, the body parsing module 232 can be implemented with a number of neural network architectures, deep learning architectures, or a combination thereof. As specific examples, the body parsing module 232 can be implemented with deep convolutional neural networks (CNNs), such as U-Net architectures, known for effective biomedical segmentation tasks. Also for example, the implementation of the body parsing module 232 can also include segmentation models, such as DeepLab, BiSeNet, or similar semantic segmentation architectures. Further for example, the implementation for the body parsing module 232 can include a model that is pretrained on extensive datasets (e.g., CelebA-HQ, CelebAMask-HQ, or similar facial parsing datasets) annotated specifically to delineate facial boundaries with high precision.

In this example embodiment, the body parsing module 232 can integrate within the image diagnostic mechanism 116 with the face mask for spatial constraints for synthetic lesion placement with the refined synthetic image 242. The flow can progress from the body parsing module 232 to the blending module 234 to compute the weighted blending mask 256 and to guide blending and ensuring synthetic acne seamlessly integrates with natural facial textures and contours.

As a more specific example, the face mask is generated at the same resolution as the patient images 114 or the accepted input image 220 to ensure spatial alignment accuracy throughout the pipeline of the image diagnostic mechanism 116, including through the blending module 234 to the output module 236. A further example is that the accepted input image 220 can be different resolutions but have an integer ratio to the rest of the pipeline so as to still achieve spatial alignment.

Returning to the blending module 234, this module can be customized for the synthetic ailment lesions for the type of targeted skin ailment 222 and for the refinement from the ailment network module 230 to blend seamlessly and naturally into the accepted input image 220. In this example embodiment, the blending module 234 takes in one or more inputs from the image input module 224 (the accepted input image 220), the body parsing module 232 (body mask 244), the ailment network module 230 (the refined synthetic image 242), or a combination thereof.

In this example embodiment, the blending module 234 combines the refined synthetic acne image ($I_{fake}$) as the refined synthetic image 242 from the ailment network module 230 with the original image ($I_{real}$) as the accepted input image 220 through a weighted blending mask 256 (w) from the blending module 234, calculated dynamically based on specific clinical and visual parameters.

$$I_{fused}=I_{real} \cdot (I-w^a)+I_{fake} \cdot w^a$$

In this example embodiment, the blending module 234 generates a fused image 258 ($I_{fused}$) from the accepted input image 220 as the original image using a weighted blending approach where w is a weighting mask calculated based on the distance from the center to the border of the acne mask, raised to the power of a.

The parameter a is dynamically adjusted according to different parameter such as the lesion size 250 of the acne overlay and the severity difference between the original and synthetic acne: a large a emphasizes the center of the synthetic acne, while a small a includes more of its periphery. In other words, a higher value for a strongly emphasize the central regions of synthetic lesions, ensuring their authenticity and minimizing peripheral visual imperfections 262. The lower values for a indicates extend the blending intensity more gradually toward lesion borders, creating a smooth, seamless transition to surrounding natural skin areas. The blending module 234 provides an adaptive approach ensures optimal blending results between the real and synthetic images.

To ensure only face acne is modified, w values are preserved only within the face mask as the body mask 244 from the body parsing module 232. The weighted blending mask 256 represents the fusion weights across the affected regions and is visualized as a black-and-white heatmap from the blending module 234. Higher mask intensity (white areas) indicates stronger blending towards synthetic lesions, emphasizing realism. Lower intensity (black or darker areas) denotes weaker blending, preserving the original image content. The heatmap guides the integration process by assigning higher weights to areas where blending needs to be more pronounced, thereby preserving the natural skin texture.

In this example embodiment, the blending module 234 generates the fusion heatmap (or the weighted blending mask 256) based on the inputs. The image input module 224 provides baseline visual information (skin tone, brightness, original skin texture) from the patient images 114. The body parsing module 232 generates the body mask 244, or in an example embodiment the face mask, to guide the blending in relevant body regions 268, or in this example embodiment the face regions. The ailment network module 230 provides a realistic, free of visual imperfections 262 in synthetic ailment lesions, or in this example embodiment for synthetic acne lesions. The blending module 234 utilizes these inputs to guide and control how and where the synthetic ailment lesions, or the synthetic acne lesions, are realistically integrated while preserving natural skin texture and maintaining clinical realism.

In this example embodiment, the flow can progress from the blending module 234 to the output module 236. The output module 236 generates synthetic images from the fused image 258 ($I_{fused}$) where the acne lesions are seamlessly incorporated, resulting in smooth, realistic inpainting. The output module 236 generates the highly realistic output image 260, integrating synthetic acne lesions seamlessly and naturally. This output image 260 benefits from analysis, careful synthetic lesion placement, customized GAN-based refinement, and adaptive weighted blending to ensure visual realism and clinical credibility essential for dermatological applications.

Figure 3:
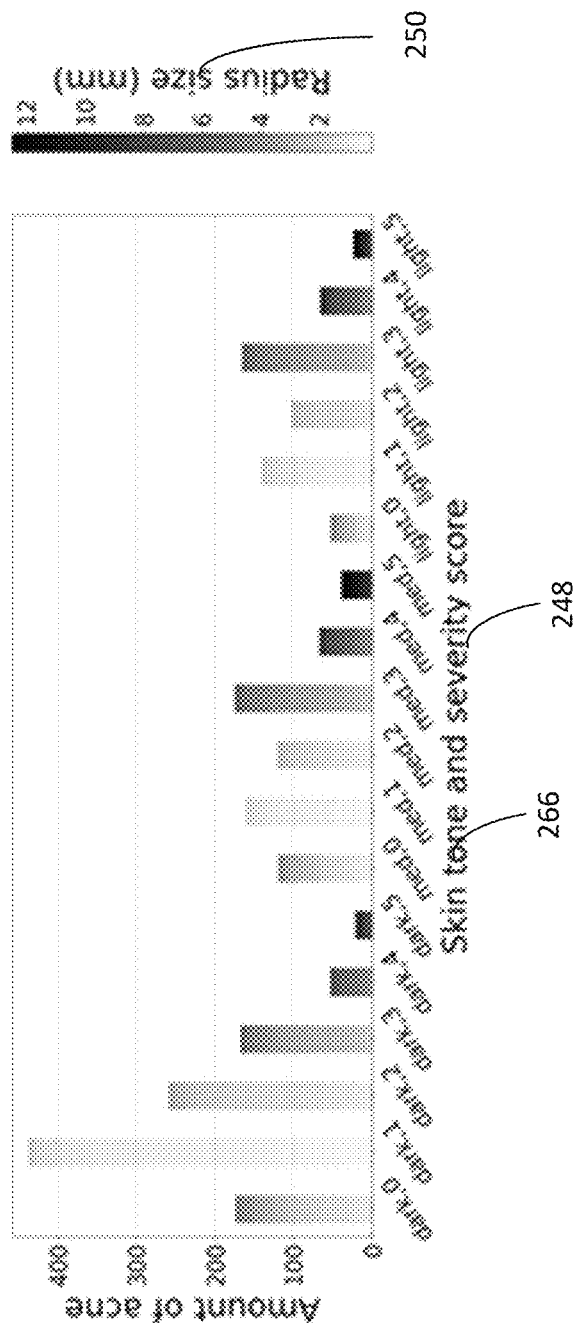
FIG. 3 is an example of a distribution of a skin lesion dataset by severity, skin tone and radius range utilized in an embodiment.

Referring now to FIG. 3, therein is shown an example of a distribution of a skin lesion dataset by lesion severity 248, skin tone for the coloration 266, and radius range utilized in an embodiment. In this example, a compiled dataset consisting of 2340 acne lesions for skin ailment lesions, reflecting various levels of severity and skin tone between different individuals and images, is shown in FIG. 3.

To generate a synthetic image in this example, at least one embodiment analyzes the image and extracts key information about the acne present, including its lesion size 250, lesion location 252, and lesion severity 248 (the skin ailment assessment module 226 of FIG. 2). Using the lesion dataset previously mentioned, at least one embodiment can then overlay synthetic acne lesions to fully cover or partially cover targeted or desired portions of the detected areas. Additionally, at least one embodiment can control the severity of each synthetic lesion, allowing for dynamic modulation of acne appearance. The control is applied based on the selected severity level: mild, moderate, severe. However, at least one embodiment addresses the visual imperfection 262 identified previously, which is the contour 264 of FIG. 2 of each pasted acne lesion that remains visible, and the overall coloration 266 of the synthetic lesion, such as acne, does not match the surrounding skin tone (the overlay ailment module 228 of FIG. 2).

Figure 4:
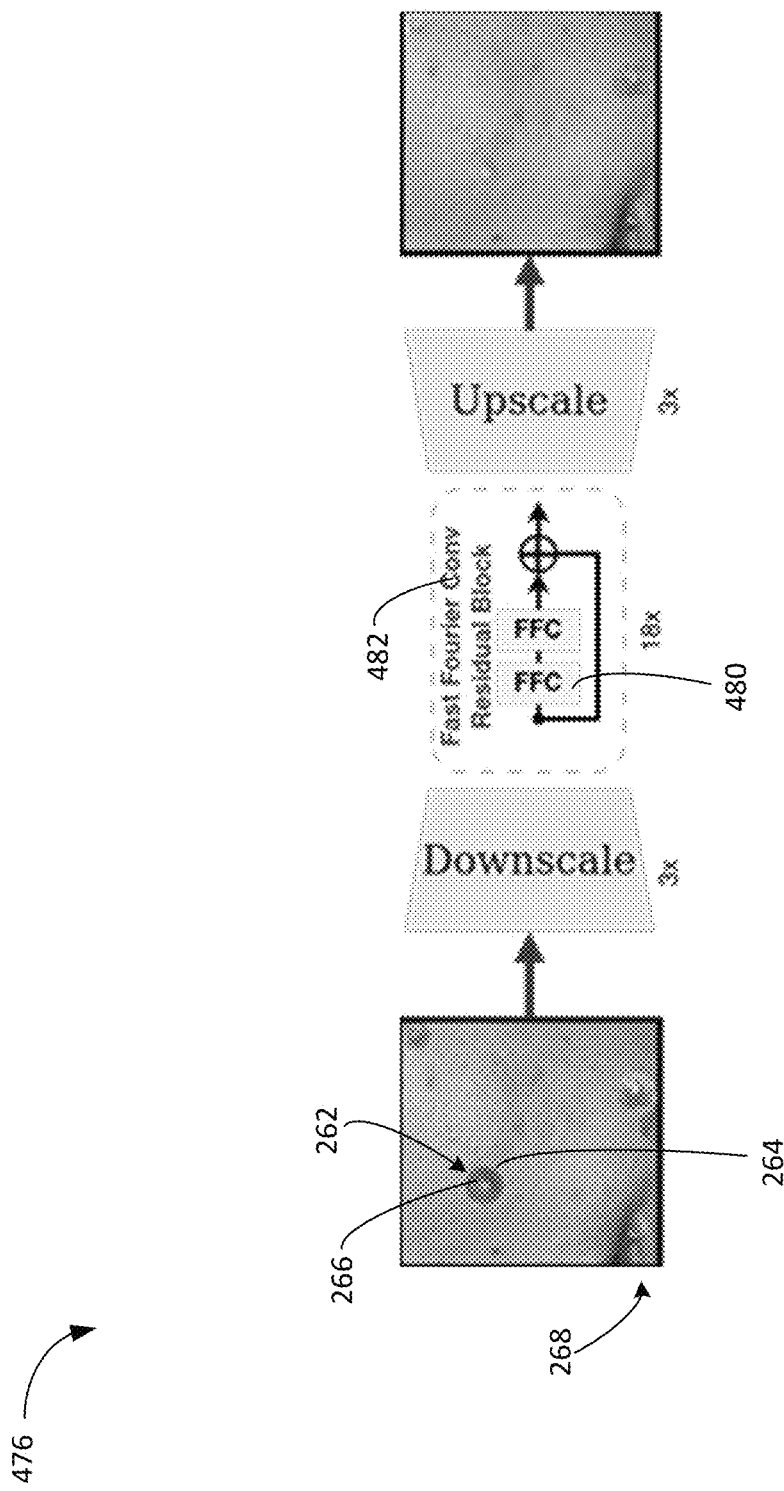
FIG. 4 is an example of an architecture of a generator in the ailment network module in an embodiment.

Referring now to FIG. 4, therein is shown an example of an architecture of a generator 476 in the ailment network module 230 of FIG. 2 in an embodiment. As an example, one or more embodiments include a generator 476 (G) and a discriminator (D) based on large-mask inpainting (LaMa) architecture. In this example, one or more embodiments leverage Fast Fourier Convolutions FFCs 480 to obtain a continuous and natural appearance in high-resolution images. By integrating FFCs 480, one or more embodiments benefit from a broad receptive field that ensures spatial coherence throughout the image.

As an example, one or more embodiments seamlessly integrate synthetic ailment lesions, such as synthetic acne lesions, into existing images while accounting for local variations or visual imperfections 262 in coloration 266, brightness, and resolution across designated regions (or "circles"). This step generates realistic blending, as acne lesions extracted from different images can exhibit discrepancies in skin tone, brightness, and texture when transferred onto a new image.

By adapting to these variations or visual imperfections 262, one or more embodiments enhance the visual coherence of the augmented images, preserving both natural appearance and clinical relevance. As a specific example, one or more embodiments train with or process acne lesions that can have different skin tones, textures, or other characteristics; at least one embodiment shall adjust these features to ensure they align with the global properties of the image. This process allows for a more natural blend, where the synthetic acne becomes consistent with the surrounding areas in terms of color, brightness, and resolution.

Continuing this example, the ailment network module 230 includes two neural network components: a generator 476 (G) of FIG. 4 and a discriminator D (not shown), which is used during training. The generator 476 (G) includes a modified or customized version of a Large-mask Inpainting (LaMa) architecture (customization described later). The generator 476 (G) also includes Fast Fourier Convolutions FFCs 480 within FFCResNet blocks 482. As an example, the generator 476 (G) includes 18 FFCResNet blocks 482, with three downsampling blocks and three upsampling blocks. The Fast Fourier Convolutions FFCs 480 ensure continuous, natural appearance, benefiting from a broad receptive field. This receptive field ensures the coherence of spatial features across large facial areas, preserving overall realism.

The generator 476 (G) of the ailment network module 230 corrects the visual imperfections 262 through the inpainting process, effectively blending synthetic lesions into the original image. This refined output appears indistinguishable from real skin ailment lesions, such as acne lesions.

Returning to the customization of the ailment network module 230, the ailment network module 230 in this example is a customized architecture with similarities to Large-Mask Inpainting (LaMa) architecture. The customization to the ailment network module 230 addresses the specific challenges and clinical needs of dermatological ailment lesion synthesis, such as for acne, and severity adjustments. The ailment network module 230 refines the synthetic acne placement from the overlay ailment module 228 to ensure seamless, clinically accurate integration of skin lesions, such as acne, into body images, such as facial images, for the patient images 114, overcoming visual imperfections 262, and maintaining image realism.

As specific examples of the customizations to the ailment network module 230, the image diagnostic mechanism 116, or a combination thereof, the customizations include lesion specific customization, dynamic severity adjustment and modulation, adaptive weighted fusion with specialized blending (described later for the blending module 234), specialized neural networks with FFCResNet blocks 482 architecture, use of a clinically curated targeted skin ailment 222 lesion dataset for training, clinical validation and user-based evaluation metrics, or a combination thereof.

An embodiment includes a discriminator (D) with an $N_d$-layer convolutional network that progressively downsamples the input image while extracting hierarchical features at multiple scales, with an example embodiment set $N_d$=4. As an example, an embodiment generator 476 (G) includes 18 FFCResNet blocks 482, along with three downsampling blocks and three upsampling blocks shown in FIG. 3. In one embodiment, the generator 476 (G) is implemented in the architecture. During training of the ailment network module 230, both the discriminator (D) and the generator 476 (G) are involved, however, the discriminator (D) is not required to be involved while the generator 476 (G) is involved.

To train this example embodiment, training utilized a dataset of full-face images (2355 total, with 1455 images from Acne04 and 900 images from another database). The dataset was randomly partitioned into training, validation, and test sets in a 4:1:1 ratio (approximately 67% training, 17% validation, and 17% testing). During training, the input is typically a 1024×1024 pixels patch of the image including acne. If the original image is large enough, a patch is cropped, but when the image is too small, its size is augmented instead to ensure compatibility with the model's input dimensions. Training this example embodiment uses a graphics processing unit (GPU) with a batch size of 1, for 200 epochs, starting with a learning rate of 1e-4.

Figure 5:
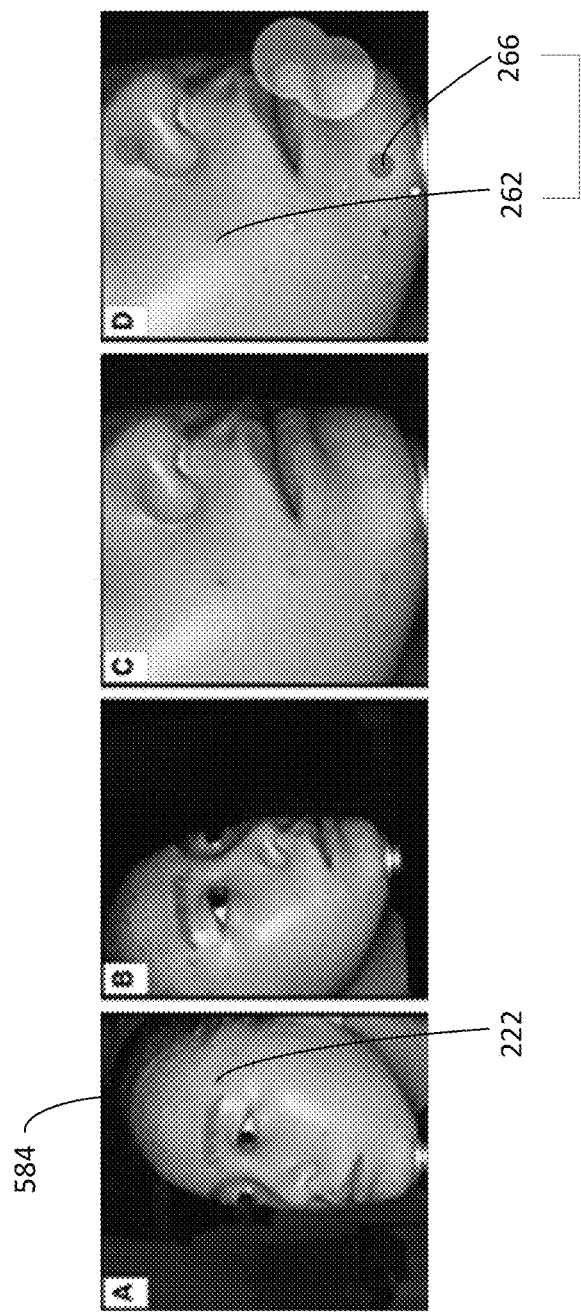
FIG. 5 are examples of images of an augmentation in an embodiment.

Referring now to FIG. 5, therein are shown examples of images of an augmentation in an embodiment. In this example, the ailment network module 230, the image diagnostic mechanism 116, or a combination thereof undergo training leveraging a data augmentation pipeline to replicate a broad spectrum of real-world variations, thereby enhancing the model's robustness and generalizability. As shown in FIG. 5, the real image 584 (labeled as A in FIG. 5) undergoes a series of spatial transformations using Albumentations. Operations such as vertical and horizontal flips, random 90-degree rotations, and optical distortions simulate natural variations in pose and perspective.

In addition, a combined shift-scale-rotate transformation randomly adjusts the position, scale, and orientation of the image, capturing even subtle differences in facial expression and orientation. These geometric transformations are synchronized with corresponding heatmaps and masks through target mappings to maintain spatial consistency. The intermediate result of these augmentations is illustrated in an image labeled B in FIG. 5.

During the data augmentation process, each image is processed by first cropping it to a fixed dimension of 1024×1024 pixels, as shown in an image labeled C in FIG. 5. Ideally, the cropping is centered on areas where acne lesions, or generally the targeted skin ailment 222, are most prominent to ensure that the lesions are well-represented. However, if an image is smaller than the target size, the image is resized instead of cropped in order to preserve details. In instances where the image dimensions are nearly equal to 1024×1024 pixels, the limited margin can result in a crop that is not perfectly centered on the lesion.

Additionally, a color augmentation is applied specifically to acne regions. This step fine-tunes hues, saturation, and subtle color shifts to mirror the complex appearance of acne lesions under different lighting scenarios, ensuring that the ailment network module 230 of FIG. 2 effectively learns the unique textures and tonal variations. To further prepare the ailment network module 230 for real-world scenarios, the pipeline introduces controlled image resolution degradation. With a predetermined probability, a randomly selected blur kernel is applied to emulate lower-resolution images, and a subsequent brightness adjustment compensates for exposure inconsistencies. This strategy not only trains the model to operate under suboptimal conditions but also equips it to handle the unpredictable variability of image quality encountered in practical applications. The output of these enhancements is depicted in an image labeled D in FIG. 5.

Overall, this augmentation strategy, diversifying both geometric and photometric properties, reduces overfitting, fostering the learning of robust invariant features, and ultimately drives the enhanced performance of the architecture of the ailment network module 230, the image diagnostic mechanism 116 of FIG. 1, or a combination thereof.

To train an embodiment of the image artificial intelligence model effectively, the training process utilized the min-max loss, which is commonly employed in generative inpainting tasks. The objective is formulated as follows:

$$\mathcal{L}_{adv} = \mathbb{E}_{x \sim \mathbb{P}_r}[\log D(x)] + \mathbb{E}_{\hat{x} \sim \mathbb{P}_g}[\log(1 - D(\hat{x}))],$$

where $\mathbb{P}_r$ and $\mathbb{P}_g$ represent the real and generated image distributions, respectively, and the D is the discriminator network. This adversarial loss encourages the generator 476 (G) to produce acne-blended regions that are indistinguishable from real skin by minimizing the difference in realism as determined by the discriminator. By learning a mapping that captures high-level statistics of real skin, this approach leads to smoother, more realistic inpainting within each circle (the ailment network module 230).

The fusing approach is designed to train an embodiment of the ailment network module 230 to adaptively address subtle variances within each targeted area, such as shifts in visual imperfections 262 as coloration 266 and brightness, allowing synthetic acne lesions to integrate smoothly with surrounding skin. By accounting for these perceptual differences in this example, an embodiment achieves natural and continuous blending of acne lesions. A post-processing step or the blending module 234 of FIG. 2 is to further refine tonal consistency and ensure a cohesive integration of acne lesions throughout the overall image structure.

For this example embodiment, the ailment network module 230 is evaluated using a dataset with 227 full-face images that were not used during training an embodiment of the image artificial intelligence model. The following is generated with three variations per image: mild, moderate, severe acne. Some of the images were excluded that are the unmodified images (those with no acne detected or acne is too small to be considered), and the dataset contains 788 images remaining. This dataset serves as the foundation for the entire validation process. Although an embodiment of the ailment network module 230 was trained on 1024×1024 images, it generalizes well to images of various resolutions.

TABLE 1

Quantitative evaluation metrics for different severity levels computed on evaluation images.

| Severity | LPIPS ↓ | SWD ↓ | FID ↓ |
|---|---|---|---|
| Mild | $2.16 \times 10^{-3}$ | $7.82 \times 10^{-5}$ | 1.96 |
| Moderate | $2.36 \times 10^{-3}$ | $9.76 \times 10^{-5}$ | 2.22 |
| Severe | $5.29 \times 10^{-3}$ | $2.34 \times 10^{-4}$ | 4.08 |
| All | $3.27 \times 10^{-3}$ | $1.36 \times 10^{-4}$ | 2.43 |

To evaluate the performance of this example embodiment, such as a generative model, three established metrics are utilized: Learned perceptual image patch similarity (LPIPS), which evaluates perceptual similarity by measuring feature differences in deep networks, with lower values indicating higher visual similarity to a reference image; Sliced Wasserstein Distance (SWD), which quantifies distributional differences between real and generated images, where lower values suggest greater similarity; and Fréchet Inception Distance (FID), which measures realism by comparing statistical properties of real and generated images, with lower scores indicating higher fidelity.

As shown in Table 1, an embodiment of the image artificial intelligence model achieved low LPIPS scores, indicating high perceptual similarity to the reference images; for comparison, LaMa obtained a score of 0.098 on CelebA-HQ. The SWD values remain consistently low, which is anticipated since the majority of the image undergoes minimal alterations by the architecture of an embodiment. The overall FID score of 2.43 is exceptionally low, suggesting that image realism is largely preserved despite the targeted modifications—whereas LaMa achieved 6.96 on CelebA-HQ. This confirms that the overall image information is maintained despite adjustments to critical areas.

Figure 6:
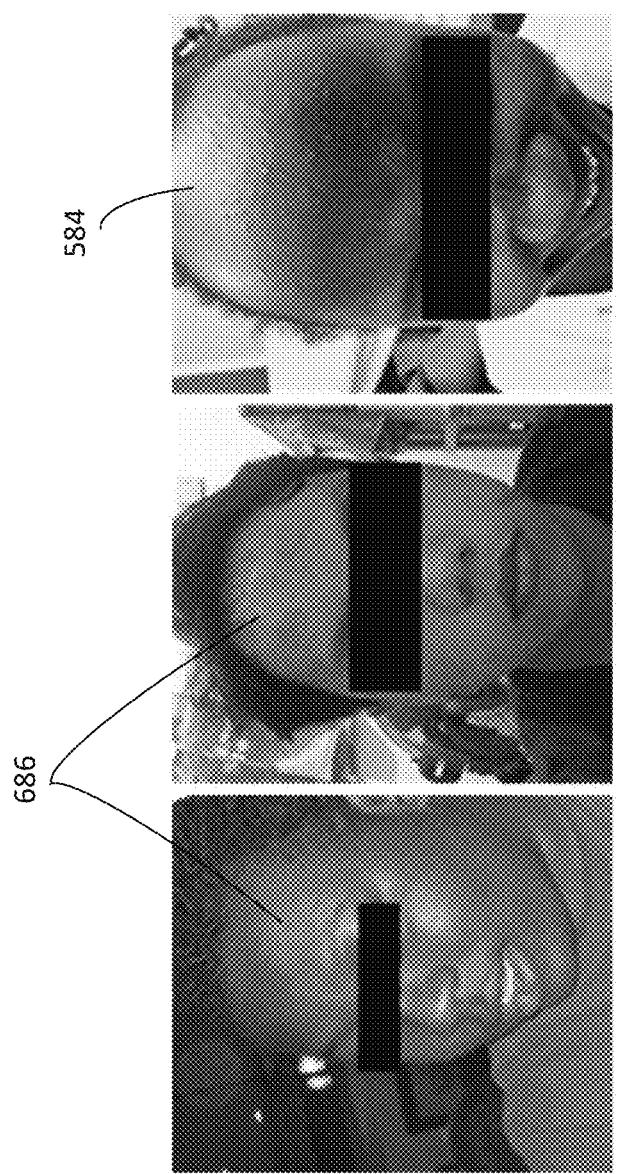
FIG. 6 are examples of images with real and fake images for an embodiment.

Referring now to FIG. 6, therein are shown examples of images with real image 584 and fake image 686 for an embodiment. These images are from the output module 236 of FIG. 2. To evaluate the pipeline, users are polled to try and differentiate real image 584 from fake image 686 as shown in FIG. 6. The example shown in FIG. 6, images from left to right are: fake 686 (reduced the severity of acne), fake 686 (increased the severity of acne), real 584. Each user is presented with only one of the four possible severity modes per image. This prevents direct comparisons. The severity mode with the severity selection 246 of FIG. 2 is randomly assigned and varies across users. 128 unique participants took part in this evaluation. Each participant classified an average of 37 images in 4 minutes and 19 seconds.

TABLE 2

Qualitative evaluation metrics are computed as weighted averages, based on the number of cases per user, except for AUC-ROC, which is unweighted. Results reflect users' performance in classifying real and fake images.

| Data Type | Precision ↑ | Recall ↑ | F1 Score ↑ | Accuracy ↑ | AUC-ROC ↑ |
|---|---|---|---|---|---|
| Real | 0.509 | 0.833 | 0.613 | 0.833 | — |
| Fake | 0.752 | 0.409 | 0.485 | 0.409 | — |
| Real + Fake | 0.630 | 0.621 | 0.549 | 0.580 | 0.620 |

Table 2 illustrates an embodiment of the performance in generating images that are difficult for users to distinguish from real 584 ones. Indeed, the precision for real 584 images is 0.51, meaning that nearly half of the images identified as "real" were not modified by our architecture. Despite this, users achieved a high recall of 0.83, correctly identifying most real 584 images when presented. For fake 686 images, precision is 0.75, meaning that when users chose the "fake" option, they were mostly right. However, the recall for fake 686 images was low, only about 40.9% of fake 686 images were correctly identified as such. Moreover, the Area Under the Receiver Operating Characteristic Curve (AUC-ROC) score of 0.62 indicates that distinguishing between real 584 and fake 686 images is a challenging task for users, the score being close to 0.5 suggests that users' performance is relatively close to random behavior.

TABLE 3

Confusion matrix: summarizes the performance of the users in classifying real and fake images. Each image is viewed only once by the same user but can be seen multiple times by different users, which leads to the sum of the matrix exceeding the total number of images.

| | Predicted Real | Predicted Fake |
|---|---|---|
| Actual Real | 1571 | 319 |
| Actual Fake | 1641 | 1131 |

Table 3 represents the confusion matrix, emphasizing the difficulty users face in identifying fake 686 images. Specifically, 1641 out of 2772 fake 686 images (59.2%) were misidentified as real 584, underscoring the challenge of distinguishing fake 686 images from unmodified ones.

One or more embodiments are capable of automatically detecting and modifying the severity of each targeted skin ailment 222 of FIG. 2, such as acne, on any facial image. One or more embodiments generate realistic datasets for training machine learning models, which can lead to more accurate diagnoses, treatment recommendations, or even personalized skincare solutions. Furthermore, one or more embodiments could serve as a valuable resource for educational platforms, aiding individuals in understanding acne progression and promoting effective management strategies.

Figure 7:
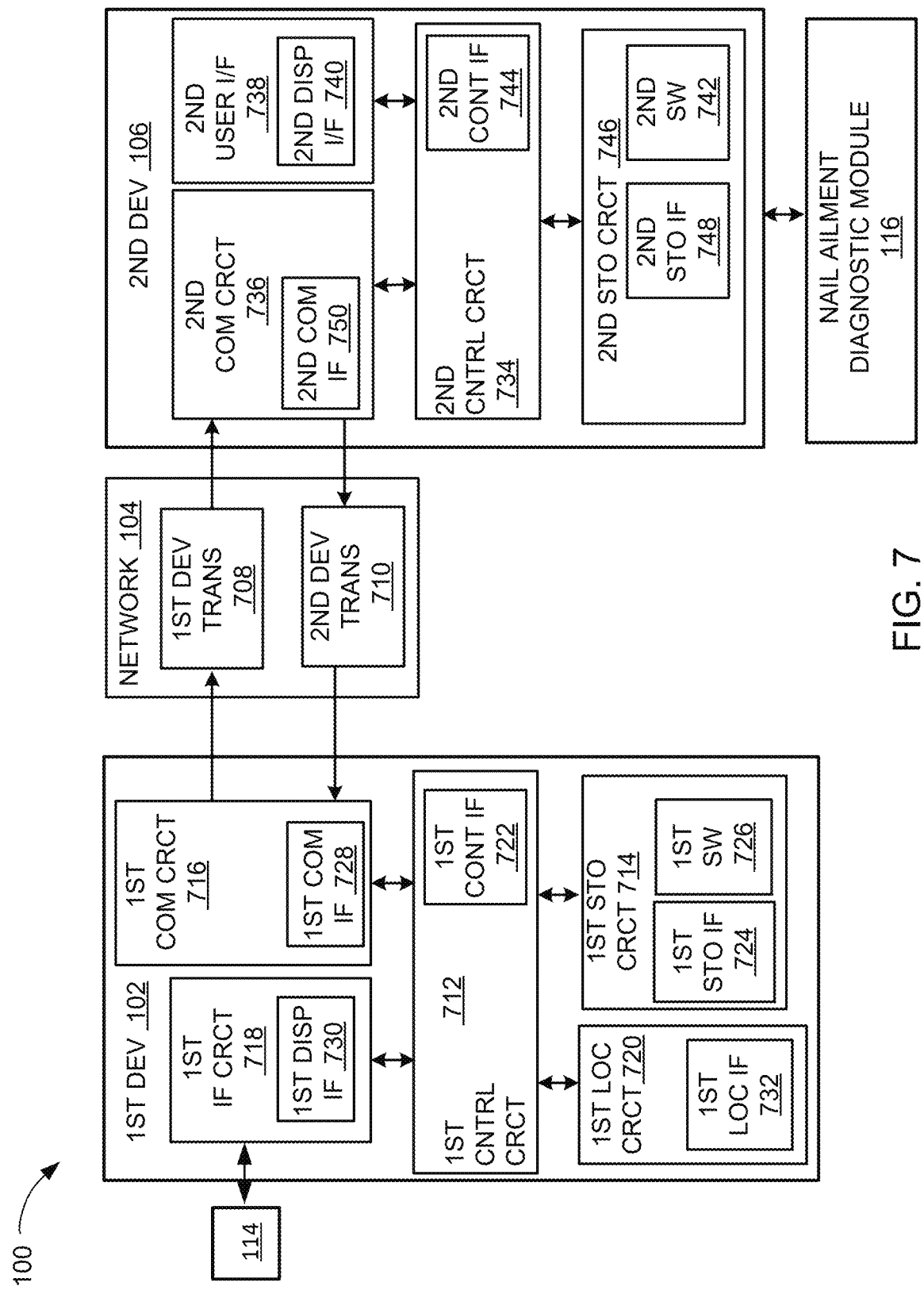
FIG. 7 is an exemplary block diagram of the compute system in an embodiment.

Referring now to FIG. 7, therein is shown an exemplary block diagram of the compute system 100 in an embodiment. The compute system 100, a portion of the compute system 100, or a combination thereof can execute the image diagnostic mechanism of FIG. 1. The compute system 100 can include the first device 102, the network 104, and the second device 106. The first device 102 can send information in a first device transmission 708 over the network 104 to the second device 106. The second device 106 can send information in a second device transmission 710 over the network 104 to the first device 102.

For illustrative purposes, the compute system 100 is shown with the first device 102 as a client device, although it is understood that the compute system 100 can include the first device 102 as a different type of device.

Also, for illustrative purposes, the compute system 100 is shown with the second device 106 as a server, although it is understood that the compute system 100 can include the second device 106 as a different type of device. For example, the second device 106 can be a client device. By way of an example, the compute system 100 can be implemented entirely on the first device 102 with some functions of the image diagnostic mechanism 116 executed by a first control circuit 712.

Also, for illustrative purposes, the compute system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 712, a first storage circuit 714, a first communication circuit 716, a first interface circuit 718, and a first location circuit 720. The first control circuit 712 can include a first control interface 722. The first control circuit 712 can execute a first software 726 to provide the intelligence of the compute system 100.

The first control circuit 712 can be implemented in a number of different manners. For example, the first control circuit 712 can be a processor, an application specific integrated circuit (ASIC), an embedded processor, a microprocessor, a hardware control logic, a hardware finite state machine (FSM), a digital signal processor (DSP), or a combination thereof. The first control interface 722 can be used for communication between the first control circuit 712 and other functional units or circuits in the first device 102. The first control interface 722 can also be used for communication that is external to the first device 102. The first control circuit 712 can process the patient images 114 and execute portions of the image diagnostic mechanism 116.

The first control interface 722 can receive information from the other functional units/circuits or from external sources, or can transmit information to the other functional units/circuits or to external destinations. The external sources and the external destinations refer to sources and destinations external to the first device 102.

The first control interface 722 can be implemented in different ways and can include different implementations depending on which functional units/circuits or external units/circuits are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The first storage circuit 714 can store the first software 726. The first storage circuit 714 can also store the relevant information, such as data representing incoming patient images 114, the image diagnostic mechanism 202 of FIG. 2 and the other embodiments, or a combination thereof.

The first storage circuit 714 can be a volatile memory, a nonvolatile memory, an internal memory, an external memory, or a combination thereof. For example, the first storage circuit 714 can be a nonvolatile storage such as non-volatile random-access memory (NVRAM), Flash memory, disk storage, or a volatile storage such as static random-access memory (SRAM).

The first storage circuit 714 can include a first storage interface 724. The first storage interface 724 can be used for communication between the first storage circuit 714 and other functional units or circuits in the first device 102. The first storage interface 724 can also be used for communication that is external to the first device 102.

The first storage interface 724 can receive information from the other functional units/circuits or from external sources, or can transmit information to the other functional units/circuits or to external destinations. The external sources and the external destinations refer to sources and destinations external to the first device 102. The first storage interface 724 can receive input from and source data to the image diagnostic mechanism 116.

The first storage interface 724 can include different implementations depending on which functional units/circuits or external units/circuits are being interfaced with the first storage circuit 714. The first storage interface 724 can be implemented with technologies and techniques similar to the implementation of the first control interface 722.

The first communication circuit 716 can enable external communication to and from the first device 102. For example, the first communication circuit 716 can permit the first device 102 to communicate with the second device 106 and the network 104. The first communication circuit 716 can interact with the second device 106 for implementing the image diagnostic mechanism 116.

The first communication circuit 716 can also function as a communication hub allowing the first device 102 to function as part of the network 104 and not limited to be an endpoint or terminal circuit to the network 104. The first communication circuit 716 can include active and passive components, such as microelectronics or an antenna, for interaction with the network 104.

The first communication circuit 716 can include a first communication interface 728. The first communication interface 728 can be used for communication between the first communication circuit 716 and other functional units or circuits in the first device 102. The first communication interface 728 can receive information from the second device 106 for distribution to the other functional units/circuits or can transmit information to the other functional units or circuits.

The first communication interface 728 can include different implementations depending on which functional units or circuits are being interfaced with the first communication circuit 78. The first communication interface 728 can be implemented with technologies and techniques similar to the implementation of the first control interface 722.

The first interface circuit 718 allows the patient 112 of FIG. 1 to interface and interact with the first device 102. The first interface circuit 718 can include an input device and an output device. Examples of the input device of the first interface circuit 718 can include a keypad, a touchpad, soft-keys, a keyboard, a microphone, a camera, an infrared sensor for receiving remote signals, or any combination thereof to provide data and communication inputs, such as the patient images 114. The first interface circuit 718 can receive the patient images 114 provided by the patient 112 that can be manipulated by the first control circuit 712.

The first interface circuit 718 can include a first display interface 730. The first display interface 730 can include an output device. The first display interface 730 can include a projector, a video screen, a touch screen, a speaker, a microphone, a keyboard, and combinations thereof. The first display interface 730 can allow the patient to view the results of the image diagnostic mechanism 202 and the other embodiments on the output device.

The first control circuit 712 can operate the first interface circuit 718 to display information generated by the compute system 100 and receive input from the patient 112. The first control circuit 712 can also execute the first software 726 for the other functions of the compute system 100, including receiving location information from the first location circuit 720. The first control circuit 712 can further execute the first software 726 for interaction with the network 104 via the first communication circuit 716. The first control circuit 712 can operate portions or all of the image diagnostic mechanism 116.

The first control circuit 712 can also receive location information from the first location circuit 720. The first control circuit 712 can operate the image diagnostic mechanism 116 or portions thereof. The first control circuit 712 can operate on the patient images 114, as well as any of the output for the image diagnostic mechanism 202 and any of the embodiments for display to the patient 112.

The first location circuit 720 can be implemented in many ways. For example, the first location circuit 720 can function as at least a part of the global positioning system, an inertial compute system, a cellular-tower location system, a gyroscope, or any combination thereof. Also, for example, the first location circuit 720 can utilize components such as an accelerometer, gyroscope, or global positioning system (GPS) receiver.

The first location circuit 720 can include a first location interface 732. The first location interface 732 can be used for communication between the first location circuit 720 and other functional units or circuits in the first device 102.

The first location interface 732 can receive information from the other functional units/circuits or from external sources, or can transmit information to the other functional units/circuits or to external destinations. The external sources and the external destinations refer to sources and destinations external to the first device 102. The first location interface 732 can receive the global positioning location from the global positioning system (not shown).

The first location interface 732 can include different implementations depending on which functional units/circuits or external units/circuits are being interfaced with the first location circuit 720. The first location interface 732 can be implemented with technologies and techniques similar to the implementation of the first control circuit 712.

The second device 106 can be optimized for implementing an embodiment of the present invention in a multiple device embodiment with the first device 102. The second device 106 can provide the additional or higher performance processing power compared to the first device 102. The second device 106 can include a second control circuit 734, a second communication circuit 736, a second user interface 738, and a second storage circuit 746.

The second user interface 738 allows an operator (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or a combination thereof.

The second control circuit 734 can execute a second software 742 to provide the intelligence of the second device 106 of the compute system 100. The second software 742 can operate in conjunction with the first software 726. The second control circuit 734 can provide additional performance compared to the first control circuit 712. The second control circuit 734 can execute instructions to implement all or some of the functions of the image diagnostic mechanism 116 including the nail ailment AI 212 of FIG. 2.

The second control circuit 734 can operate the second user interface 738 to display information. The second control circuit 734 can also execute the second software 742 for the other functions of the compute system 100, including operating the second communication circuit 736 to communicate with the first device 102 over the network 104.

The second control circuit 734 can be implemented in a number of different manners. For example, the second control circuit 734 can be a processor, an embedded processor, a microprocessor, hardware control logic, a hardware finite state machine (FSM), a digital signal processor (DSP), or a combination thereof.

The second control circuit 734 can include a second control interface 744. The second control interface 744 can be used for communication between the second control circuit 734 and other functional units or circuits in the second device 106. The second control interface 744 can also be used for communication that is external to the second device 106.

The second control interface 744 can receive information from the other functional units/circuits or from external sources, or can transmit information to the other functional units/circuits or to external destinations. The external sources and the external destinations refer to sources and destinations external to the second device 106.

The second control interface 744 can be implemented in different ways and can include different implementations depending on which functional units/circuits or external units/circuits are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

The second storage circuit 746 can store the second software 742. The second storage circuit 746 can also store the information such as data representing incoming patient images 114, data representing the individual nail images 218 of FIG. 2, sound files, or a combination thereof. The second storage circuit 746 can be sized to provide the additional storage capacity to supplement the first storage circuit 714.

For illustrative purposes, the second storage circuit 746 is shown as a single element, although it is understood that the second storage circuit 746 can be a distribution of storage elements. Also, for illustrative purposes, the compute system 100 is shown with the second storage circuit 746 as a single hierarchy storage system, although it is understood that the compute system 100 can include the second storage circuit 746 in a different configuration. For example, the second storage circuit 746 can be formed with different storage technologies forming a memory hierarchal system including different levels of caching, main memory, rotating media, or off-line storage.

The second storage circuit 746 can be a controller of a volatile memory, a nonvolatile memory, an internal memory, an external memory, or a combination thereof. For example, the second storage circuit 746 can be a controller of a nonvolatile storage such as non-volatile random-access memory (NVRAM), Flash memory, disk storage, or a volatile storage such as static random access memory (SRAM).

The second storage interface 748 can receive information from the other functional units/circuits or from external sources, or can transmit information to the other functional units/circuits or to external destinations. The external sources and the external destinations refer to sources and destinations external to the second device 106.

The second storage interface 748 can include different implementations depending on which functional units/circuits or external units/circuits are being interfaced with the second storage circuit 746. The second storage interface 748 can be implemented with technologies and techniques similar to the implementation of the second control interface 744.

The second communication circuit 736 can enable external communication to and from the second device 106. For example, the second communication circuit 736 can permit the second device 106 to communicate with the first device 102 over the network 104.

The second communication circuit 736 can also function as a communication hub allowing the second device 106 to function as part of the network 104 and not limited to be an endpoint or terminal unit or circuit to the network 104. The second communication circuit 736 can include active and passive components, such as microelectronics or an antenna, for interaction with the network 104.

The second communication circuit 736 can include a second communication interface 750. The second communication interface 750 can be used for communication between the second communication circuit 736 and other functional units or circuits in the second device 106. The second communication interface 750 can receive information from the other functional units/circuits or can transmit information to the other functional units or circuits.

The second communication interface 750 can include different implementations depending on which functional units or circuits are being interfaced with the second communication circuit 736. The second communication interface 750 can be implemented with technologies and techniques similar to the implementation of the second control interface 744.

The second communication circuit 736 can couple with the network 104 to send information to the first device 102. The first device 102 can receive information in the first communication circuit 716 from the second device transmission 710 of the network 104. The compute system 100 can be executed by the first control circuit 712, the second control circuit 734, or a combination thereof. For illustrative purposes, the second device 106 is shown with the partition containing the second user interface 738, the second storage circuit 746, the second control circuit 734, and the second communication circuit 736, although it is understood that the second device 106 can include a different partition. For example, the second software 742 can be partitioned differently such that some or all of its function can be in the second control circuit 734 and the second communication circuit 736. Also, the second device 106 can include other functional units or circuits not shown in FIG. 7 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function of the image diagnostic mechanism 116, a portion therein, or a combination thereof.

For illustrative purposes, the compute system 100 is described by operation of the first device 102 and the second device 106. It is understood that the first device 102 and the second device 106 can operate any of the modules and functions of the compute system 100 including a distribution of the functions of the image diagnostic mechanism 116.

Figure 8:
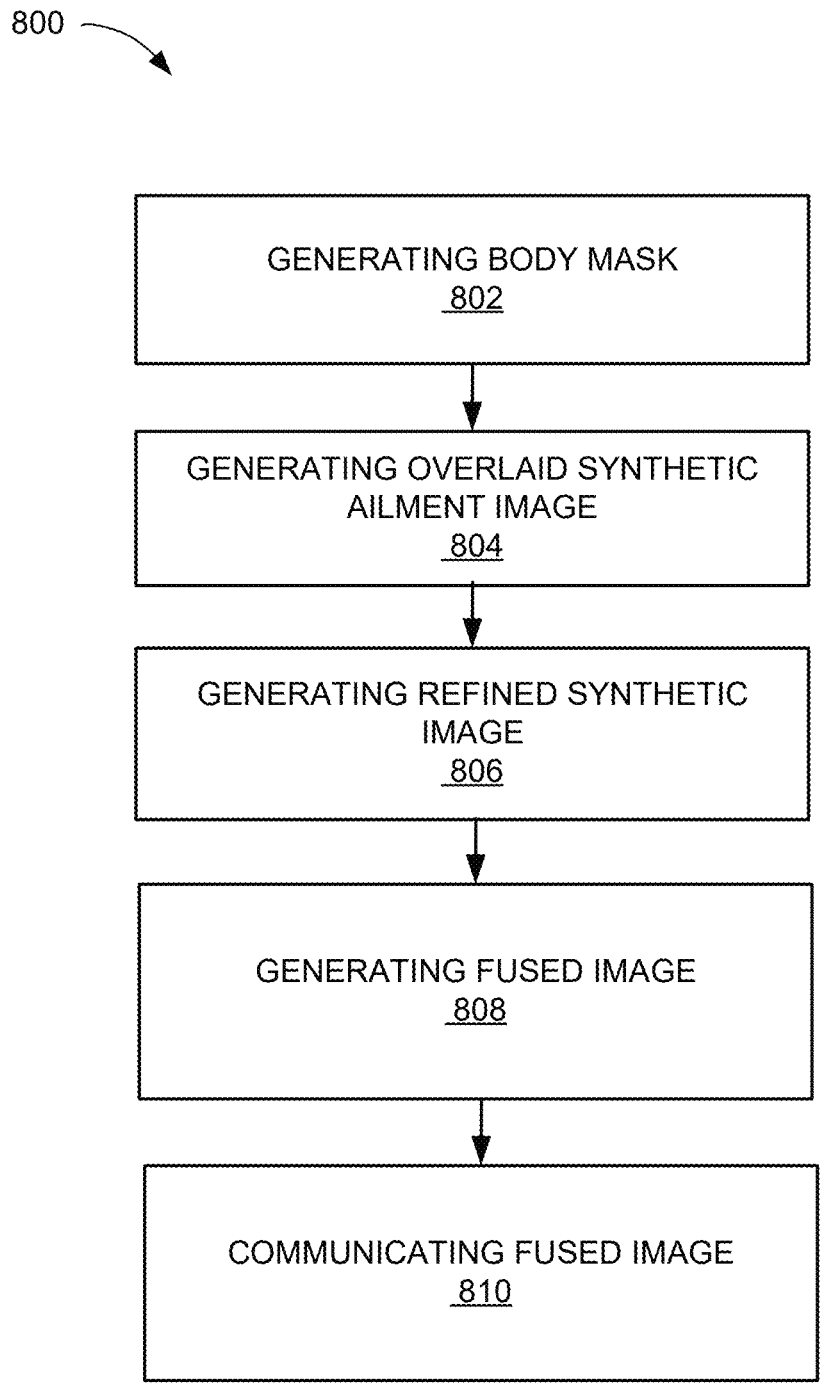
FIG. 8 is a flow chart of a method of operation of a compute system in an embodiment of the present invention.

Referring now to FIG. 8, therein is shown a flow chart of a method 800 of operation of a compute system 100 of FIG. 1 in an embodiment of the present invention. The method 800 includes: generating a body mask based on the patient image in a block 802; generating an overlaid synthetic ailment image for a targeted skin ailment and based on a patient image in a block 804; generating a refined synthetic image based on the overlaid synthetic ailment image in a block 806; generating a fused image based on the refined synthetic image by smoothing a visual imperfection and guided by the body mask in a block 808; and communicating the fused image for displaying on a device in a block 810.

One or more embodiments provide heatmap-based approach by prioritizing transparency and usability for healthcare professionals. An embodiment not only generates intuitive heatmaps but also addresses the challenge to ensure enhancements of clinical decision-making, while not hindering visualizations of a given pathology. By translating heatmaps into contour-based representations, the outputs of an embodiment maintains the visual clarity of the original skin lesion image and provides clear delineations of severity levels.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a compute system comprising:
   generating a body mask based on a patient image;
   generating an overlaid synthetic ailment image for a targeted skin ailment and based on the patient image;
   generating a refined synthetic image based on the overlaid synthetic ailment image;
   generating a fused image based on the refined synthetic image by smoothing a visual imperfection and guided by the body mask; and
   communicating the fused image for displaying on a device.

2. The method as claimed in claim 1 wherein generating the overlaid synthetic ailment image for the targeted skin ailment and based on the patient image includes:
   identifying a selected synthetic skin ailment based on a severity selection; and
   generating the overlaid synthetic ailment image by overlaying the selected synthetic skin ailment.

3. The method as claimed in claim 1 wherein generating the fused image based on the refined synthetic image by smoothing the visual imperfection and guided by the body mask includes removing a contour of the visual imperfection.

4. The method as claimed in claim 1 wherein generating the fused image based on the refined synthetic image by smoothing the visual imperfection and guided by the body mask includes smoothing the visual imperfection to a body region from the body mask for the targeted skin ailment.

5. The method as claimed in claim 1 wherein generating the fused image based on the refined synthetic image by smoothing the visual imperfection and guided by the body mask includes:
   computing a weighted blending mask based on a lesion size for the targeted skin ailment; and
   generating the fused image based on the weighted blending mask.

6. The method as claimed in claim 1 wherein generating the refined synthetic image based on the overlaid synthetic ailment image includes utilizing a generator to process Fast Fourier Convolutions for addressing the visual imperfection in the overlaid synthetic ailment image.

7. The method as claimed in claim 1 generating the fused image includes generating the fused image for acne as the targeted skin ailment.

8. A compute system comprising:
   a control circuit, including a processor, configured to:
      generate a body mask based on a patient image;
      generate an overlaid synthetic ailment image for a targeted skin ailment and based on the patient image;
      generate a refined synthetic image based on the overlaid synthetic ailment image;
      generate a fused image based on the refined synthetic image by smoothing a visual imperfection and guided by the body mask; and
      communicate the fused image for displaying on a device.

9. The system as claimed in claim 8 wherein the control circuit is configured:
   identify a selected synthetic skin ailment based on a severity selection; and
   generate the overlaid synthetic ailment image by overlaying the selected synthetic skin ailment.

10. The system as claimed in claim 8 wherein the control circuit is configured to:
    remove a contour of the visual imperfection.

11. The system as claimed in claim 8 wherein the control circuit is configured to:
    smooth the visual imperfection to a body region from the body mask for the targeted skin ailment.

12. The system as claimed in claim 8 wherein the control circuit is configured to:
    compute a weighted blending mask based on a lesion size for the targeted skin ailment; and
    generate the fused image based on the weighted blending mask.

13. The system as claimed in claim 8 wherein the control circuit is configured to utilize a generator to process Fast Fourier Convolutions for addressing the visual imperfection in the overlaid synthetic ailment image.

14. The system as claimed in claim 8 wherein the control circuit is configured to:
    generate the fused image for acne as the targeted skin ailment.

15. A non-transitory computer readable medium including instructions executable by a control circuit for a compute system performing functions comprising:
    generating a body mask based on a patient image;
    generating an overlaid synthetic ailment image for a targeted skin ailment and based on the patient image;
    generating a refined synthetic image based on the overlaid synthetic ailment image;
    generating a fused image based on the refined synthetic image by smoothing a visual imperfection and guided by the body mask; and
    communicating the fused image for displaying on a device.

16. The non-transitory computer readable medium as claimed in claim 15 wherein generating the overlaid synthetic ailment image for the targeted skin ailment and based on the patient image includes:
    identifying a selected synthetic skin ailment based on a severity selection; and generating the overlaid synthetic ailment image by overlaying the selected synthetic skin ailment.

17. The non-transitory computer readable medium as claimed in claim 15 wherein generating the fused image based on the refined synthetic image by smoothing the visual imperfection and guided by the body mask includes removing a contour of the visual imperfection.

18. The non-transitory computer readable medium as claimed in claim 15 wherein generating the fused image based on the refined synthetic image by smoothing the visual imperfection and guided by the body mask includes smoothing the visual imperfection to a body region from the body mask for the targeted skin ailment.

19. The non-transitory computer readable medium as claimed in claim 15 wherein generating the fused image based on the refined synthetic image by smoothing the visual imperfection and guided by the body mask includes:
   computing a weighted blending mask based on a lesion size for the targeted skin ailment; and
   generating the fused image based on the weighted blending mask.

20. The non-transitory computer readable medium as claimed in claim 15 wherein generating the refined synthetic image based on the overlaid synthetic ailment image includes utilizing a generator to process Fast Fourier Convolutions for addressing the visual imperfection in the overlaid synthetic ailment image.

* * * * *